United States Patent
Dahl et al.

(10) Patent No.: US 12,261,456 B2
(45) Date of Patent: Mar. 25, 2025

(54) WIRELESS CHARGING SYSTEMS

(71) Applicant: SINTEF TTO AS, Trondheim (NO)

(72) Inventors: Tobias Dahl, Trondheim (NO); Jostein Thorstensen, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 0 days.

(21) Appl. No.: 17/926,492

(22) PCT Filed: May 20, 2021

(86) PCT No.: PCT/GB2021/051231
§ 371 (c)(1),
(2) Date: Nov. 18, 2022

(87) PCT Pub. No.: WO2021/234400
PCT Pub. Date: Nov. 25, 2021

(65) Prior Publication Data
US 2023/0187977 A1 Jun. 15, 2023

(30) Foreign Application Priority Data
May 21, 2020 (GB) .................................... 2007604
May 11, 2021 (GB) .................................... 2106711

(51) Int. Cl.
*H02J 50/30* (2016.01)
*H02J 7/35* (2006.01)
*H02J 50/80* (2016.01)
*H02J 50/90* (2016.01)

(52) U.S. Cl.
CPC .............. *H02J 50/30* (2016.02); *H02J 7/35* (2013.01); *H02J 50/80* (2016.02); *H02J 50/90* (2016.02)

(58) Field of Classification Search
CPC .. H02J 50/30; H02J 50/80; H02J 50/90; H02J 7/35
USPC ........................................................ 307/104
See application file for complete search history.

(56) References Cited

U.S. PATENT DOCUMENTS

| | | | | |
|---|---|---|---|---|
| 9,379,543 | B2 * | 6/2016 | Keysar | H02J 50/001 |
| 10,424,974 | B2 * | 9/2019 | Prasad | G06F 1/3203 |
| 2011/0266995 | A1 * | 11/2011 | Winfield | H02J 50/402 |
| | | | | 307/104 |
| 2016/0344226 | A1 | 11/2016 | Wu et al. | |
| 2017/0018976 | A1 * | 1/2017 | Mor | H02J 50/40 |
| 2017/0093228 | A1 * | 3/2017 | Fisher | H02J 7/35 |
| 2017/0294809 | A1 * | 10/2017 | Slepoy | H02J 50/30 |
| 2018/0366993 | A1 * | 12/2018 | Mor | H04B 10/807 |

FOREIGN PATENT DOCUMENTS

DE 102014205750 A1 10/2015

OTHER PUBLICATIONS

International Search Report and Written Opinion, International Application No. PCT/GB2021/051231, mailed Aug. 16, 2021.

* cited by examiner

*Primary Examiner* — Alfonso Perez Borroto
(74) *Attorney, Agent, or Firm* — MARSHALL, GERSTEIN & BORUN LLP (57) ABSTRACT

A system for wirelessly charging at least one device disclosed. The device has a photovoltaic cell for converting incident light into electrical energy. The system also has a supply unit arranged to transmit a charging laser beam to the photovoltaic cell of the device. The supply unit is also arranged to transmit a visible light pattern for providing a user with information relating to operation of the system.

21 Claims, 11 Drawing Sheets

WIRELESS CHARGING SYSTEMS

BACKGROUND

With the continued proliferation of electronic devices, particularly those where it is not convenient or possible to provide a permanent wired connection to a mains power supply, and growing expectations for the functionality and battery life that these provide, there remains an important focus on how such devices are charged.

There have been a number of developments in charging technology in recent years, most notably the introduction of magnetic induction charging to avoid the need for a physical coupling between the charger and the device being charged. Whilst this technology may be well suited to personal portable devices such as smart phones, smart watches, tablets etc., the need for a close physical proximity between the device and the charging surface does not make this technology suitable in all circumstances.

There have also been proposals to use lasers to provide power to charge devices by using the laser to illuminate a suitable photocell on the device. This has the advantage of removing the need for the device to be held close to a charging surface. However, it suffers from some significant drawbacks. One of these is the requirement to have in place a suitable feedback system to ensure alignment between the laser and the photocell. The Applicant has further appreciated that it may not be easy for the user of such a wireless charging system to know how to ensure devices are charging, particularly when the devices are very small.

Moreover, the above-mentioned laser charging methods are only capable of providing low charging currents. On one hand, although there are steady improvements being made, the efficiency of photovoltaic cells is still in general a long way below the theoretical maximum. On the other hand, there are stringent safety restrictions on the power levels for lasers that can be used in ordinary public, workplace or domestic settings.

For these and other reasons, the aforementioned remote laser charging has yet to be widely adopted.

SUMMARY

When viewed from a first aspect the present invention provides a system for wirelessly charging at least one device, said device comprising a photovoltaic cell for converting incident light into electrical energy, the system further comprising a supply unit arranged to transmit a charging laser beam to the photovoltaic cell of the device, wherein the supply unit is further arranged to transmit a visible light pattern for providing a user with information relating to operation of the system.

Thus, it will be seen that in accordance with the invention, the supply unit of the wireless charging system can transmit laser light for charging a device and a visible light pattern. This is advantageous in instances where the charging laser is invisible and/or when the device does not have a display means to indicate that the device is charging. In such circumstances, the visible light pattern may allow the user to obtain information relating to the operation of the system, e.g. to confirm whether the wireless charging system is in operation, without the need of a display screen.

In a set of embodiments, the visible light pattern provides information in the form of an indication of a charging status, e.g. the charging status may comprise a symbol to indicate that charging is taking place. Equally, the charging status may comprise an indication of the charging level, i.e. the percentage of battery charged at a point in time. The charging status and/or charging level may be represented in any suitable way, e.g. symbols, images, words, numerals, or percentages.

In another set of embodiments, the information relating to the operation of the system comprises information relating to the operation of the device to be charged. This means that the user could be given information unrelated to the charging of the device. For example, when the device to be charged is a pair of wireless earphones, the light pattern projected from the supply unit could comprise information relating to current volume level setting etc.

In principle, the device could be charged anywhere in a given area such as a room as long as there is an unobstructed line of sight between the supply unit and the PV cell of the device to be charged (DTC). In a set of embodiments however, the visible light pattern indicates a zone in which the device should be placed. In such a set of embodiments, the supply unit may be arranged to transmit the laser beam to the photovoltaic (PV) cell of the device automatically when the device is placed in the indicated zone. Such arrangements may be beneficial in reducing the area over which the supply unit needs to 'search' for the device—e.g. by scanning the charging laser and are considered novel and inventive in their own right. Thus when viewed from a second aspect, the invention provides a method of wirelessly charging at least one device having a photovoltaic cell for converting incident light into electrical energy, said method comprising: transmitting a visible light pattern indicating a zone; placing said device into said zone; and transmitting a charging laser beam to the PV cell of the device to effect powering or charging said device.

In a set of such embodiments the device could be arranged to determine that it is in the indicated zone—e.g. by detecting the visible light from the PV cell. The device may communicate to the supply unit that it is in the indicated zone—e.g. using a radio signal such as Bluetooth™ or the like.

In another set of embodiments, the supply unit is arranged to determine that the device is in the indicated zone—e.g. by detecting that the charging laser beam has been 'broken' by the DTC or by imaging the indicated zone using a camera.

In a set of embodiments, the system projects a visible light pattern confirming that the device is in the above-mentioned charging zone. This may involve drawing a visible light pattern around the perimeter of the DTC and/or projecting a visible indication of scanning—e.g. the visible light pattern could resemble a grid which the user may recognise as a visual cue related to scanning.

It will be appreciated by the skilled person that the supply unit must determine or receive information regarding the location of the DTC in order to direct the charging laser to the PV cell of the DTC. In a set of embodiments, the information relating to the location of the device is obtained by scanning the laser beam over a scan volume and the supply unit receiving a notification when the laser beam impinges on the photovoltaic (PV) cell. As will be appreciated, such an arrangement allows the system to determine at least an approximate location of the DTC by correlating receipt of the notification (or a time stamp in the notification), with a control algorithm for the laser beam scan, which can establish a direction in which the laser beam was pointing when it impinged on the PV cell. The Applicant has recognised that even with the approach described herein, it is possible that the laser beam may be largely incident upon the PV cell but slightly misaligned such that not all of the available laser light energy is being used to power the device. In a set of embodiments, the system conducts a power delivery optimisation phase comprising a feedback loop wherein the beam is moved in response to a power value reported by the DTC to the supply unit. This could be used to improve the alignment of the illuminated area of the laser beam upon the PV cell. The power value reported to the supply unit is dependent on the power delivered to the DTC by the laser beam. In order to refine the alignment of the laser beam and PV cell, the laser beam may undergo small movements in position. The movement of the laser beam may be maintained if the power value is reported to rise and changed or reversed if the power value is reported to decrease. For example, if the DTC is situated on the x-y plane, orthogonal adjustments may be made based on the reported power values, first in the ±x direction and then the ±y direction, repeating iteratively. In a set of such embodiments, the power delivery optimisation phase may be halted when a suitable power value is reported by the DTC.

The optimisation of power delivery as described above may be performed only once by the system (e.g. at the beginning of charging). Equally, the optimisation of power delivery may be performed periodically and/or if a diminution in power is reported by the DTC.

The visible light pattern may be intended for the user to passively observe, e.g. with the sole purpose of providing the user with information. In a set of embodiments, however, the light pattern forms part of an interactive user interface. In such a set of embodiments, the user may be able to control the device or operation of the wireless charging system via an interaction mechanism.

The visible light pattern may indicate to the user that an adjustment of the device is necessary to improve charging. In a set of embodiments, the visible light pattern comprises instructions or a visual prompt for the user to move or tilt the device to improve charging or power delivery—e.g. to improve the alignment of the charging beam with the PV cell of the device or to remove the device from an area that may be blocked by other objects (which may be blocking the line of sight between the device and the supply unit). For example, if multiple devices are near to each other or are overlapping, a visible light pattern may be projected comprising instructions or a visual prompt to the user to separate the devices to allow one or more of them to be properly powered or charged.

In a set of embodiments the interaction mechanism comprises voice control. In other words, the user can speak commands which can be detected by the system and subsequently processed to facilitate interaction with the visible light pattern—e.g. the voice command "show charging level" would prompt the system to display a visible light pattern in the form of the charging level of the device. In such a set of embodiments, the DTC and/or the supply unit would comprise a suitable sound sensor, e.g. a microphone, for detecting such commands.

In a set of embodiments the interaction mechanism comprises gesture recognition—e.g. the supply unit may comprise a gesture recognition module. For example, a gesture may comprise movement of the user's hand. In a set of embodiments, the gesture is sensed by acoustic means—e.g. ultrasound or echolocation. In another set of embodiments, the gesture is sensed by optical means—e.g. a low-resolution camera or beam-breakage detection. In a set of embodiments, the system comprises a 3D imaging system arranged to recognise gestures—e.g. by 3D imaging the hand of the user in real-time. Any suitable 3D imaging technology could be employed such as a 3D camera, ultrasound gesture detection etc.

The system may communicate to the user that a gesture is recognised or that the 3D imaging system is in operation in any suitable way—e.g. using a visual or audible indication.

In some embodiments, the visible light pattern comprises one or more options and the system is arranged to determine a user's selection of the option or one of the options. In other words, the visible light pattern may appear as an option menu enabled for user interaction. The ability of the user to select options may allow the user to control certain aspects of the device or the system's operation. The user could interact with the menu using vocal commands. However, in a preferred set of embodiments, the user selects an option using touchless gestures. The selection of an option may be detected using optical or ultrasonic methods. For example, in the case of optical detection, the selection of an option may comprise the user breaking the charging laser beam from the supply unit to the PV cell on the device.

In a set of embodiments, the visible light pattern is drawn by a gesture. The gesture could be touchless or motion based, e.g. performed by the movement of the user's hand or movement of a device, e.g. the DTC. In other words the user's hand or the device could be used similarly to a stylus—e.g. for indicating where the visible light pattern should be projected to. In a set of embodiments, the gesture could draw a shape or symbol for the light pattern to project.

In a set of embodiments, when a gesture is performed the supply unit transmits a visible pattern outlining the trajectory of the motion in real time. The system may then recognise the symbol that has been drawn, optionally changing the appearance of the outline to the correct symbol. This has the advantage of confirming to the user that symbol recognition has occurred. The system may then execute an associated command.

As mentioned above, in a set of embodiments, the visible light pattern is defined, at least partially, by the movement of the device tracked by the system. In such a set of embodiments, the movement of the device may be tracked using a feedback loop of power level monitoring. In this feedback loop, the charging beam may begin incident upon the PV of the device, whilst the beam undergoes small movements in position and the supply unit monitors the power delivered to the device after each small movement of the beam. The supply unit may obtain power delivery measurements from the DTC over any suitable wireless connection, e.g. Bluetooth™, WiFi, Zig Bee etc. The movement of the device may be detected and tracked by a correlation of the power level increase or decrease and the direction of the movement of the beam. It will be appreciated that this mechanism is very similar to the power optimisation discussed above for a static device and indeed the same mechanism may be used.

Alternatively, the movement of the device may be detected and tracked using existing local positioning systems, e.g. Real-Time Locating System (RTLS) methods. Existing RTLS technologies typically involve attaching a tag to an object which is to be identified and tracked. The tag may wirelessly transmit signals (e.g. radio, infrared, acoustic etc.) to be detected by fixed receivers which determine the location of the tags from the received signals. In a set of embodiments, the motion of the device is tracked using ultrasound—e.g. the device may comprise an ultrasound transmitter arranged to transmit ultrasound pulses which can be detected by the system. A subset of radio local positioning systems involve ultra wideband tags. In a set of embodiments, the motion of the DTC may be tracked using ultra wideband (UWB) tags. Using UWB frequencies in particular may help to keep power consumption low while giving relatively high tracking precision.

When viewed from a third aspect the invention provides a method of operating a wireless charging system for charging at least one device having a photovoltaic cell for converting incident light into electrical energy, said method comprising: transmitting a charging laser beam to said PV cell and thereby powering or charging said device; transmitting a visible light pattern indicating at least one user selection option; detecting a user selecting said option; and carrying out a further action dependent on said option being selected.

The DTC could communicate wirelessly to the supply unit, e.g. in order to confirm charging, by transmitting a signal, e.g. WiFi, Bluetooth™, or Zigbee. However, in set of embodiments the notification from the DTC—e.g. to confirm that the beam is incident on the PV cell of the device—comprises a retro-reflection of the laser beam back to the supply unit. In other words, compatible devices to be charged would need to comprise a retro-reflector arranged to reflect the laser beam back towards the supply unit when it impinges on the respective PV cell. Such an arrangement may be beneficial in that it does not require establishment of any other communication channel and can be entirely passive on the part of the DTC. This could be important, for example, if the DTC were completely discharged and thus had insufficient power to be able to communicate actively.

In another set of embodiments, the notification comprises a signal sent over an independent communication channel when the DTC detects that the laser beam has impinged on its PV cell. Such a signal could be for any convenient type e.g. optical, ultrasound etc. but in a set of embodiments comprises an RF signal. A dedicated format could be used but advantageously an established protocol could be used such as Bluetooth™, WiFi, Zigbee etc. In a set of such embodiments the laser beam has sufficient power density to provide enough power to a device to be charged to be able to transmit the notification signal.

Typically the supply unit will be fixed—e.g. to a ceiling of a room where it is relatively unobtrusive and would normally have the best line of sight view of devices in the room. However, it could equally be fixed on a wall or provided on a portable device, which would provide the advantage that it could be moved to wherever required, potentially on a temporary basis.

The pattern could be produced using any suitable means. For example an LED array of a digital micro-mirror device (DMD) could be employed. In a set of embodiments the pattern is generated by a laser. In a set of such embodiments, the supply unit comprises at least one steerable reflector, e.g. a micro-mirror, for directing the laser beam. In a set of such embodiments, the supply unit comprises a plurality of steerable micro-mirrors. This could, advantageously have overlapping fields of view which would allow a wider range of coverage than the operating range of an individual steerable micro-mirror was able to provide. In a set of embodiments, the plurality of micro-mirrors are arranged to allow for multiple reflections.

In the supply unit, the visible light beam, e.g. laser, and charging laser could share a common steerable micro-mirror. In a set of embodiments, however, the visible light beam and charging laser are each directed to respectively different steerable micro-mirrors.

The supply unit could be a hub unit connected to the mains electricity supply, e.g. situated on the ceiling of a room. However, in a set of embodiments, the supply unit is a relay unit separate from a hub unit and comprising a wired or wireless connection to the hub unit. In such a set of embodiments, the relay unit may be wirelessly powered or charged by the hub unit, similarly to how a device is charged by the supply unit, i.e. the laser may be transmitted from a hub unit to a PV cell on the relay unit which converts light energy into an electrical voltage.

In a set of embodiments in accordance with the first or third aspects of the invention, the system comprises a wireless communication channel between the device and the system, e.g. between the device and the supply unit, for the device to communicate instructions for transmitting the visible pattern. For example, the device may wirelessly communicate to the supply unit, e.g. by radio, information which is to be projected in the visible pattern—e.g. projections specific to the operation of the device.

Although the foregoing description has only mentioned single devices to be charged, it will of course be appreciated that the system may be able to charge multiple devices. This could be done by using a time-division scheme whereby a single laser is moved between multiple devices (and potentially be in different modes with their differing divergence angles in respect of each device) in a cyclic pattern. Equally, a single laser source could be split to provide multiple laser beams (i.e. spatial division could be used) or multiple laser sources could be provided. Of course any combination of these could also be used.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
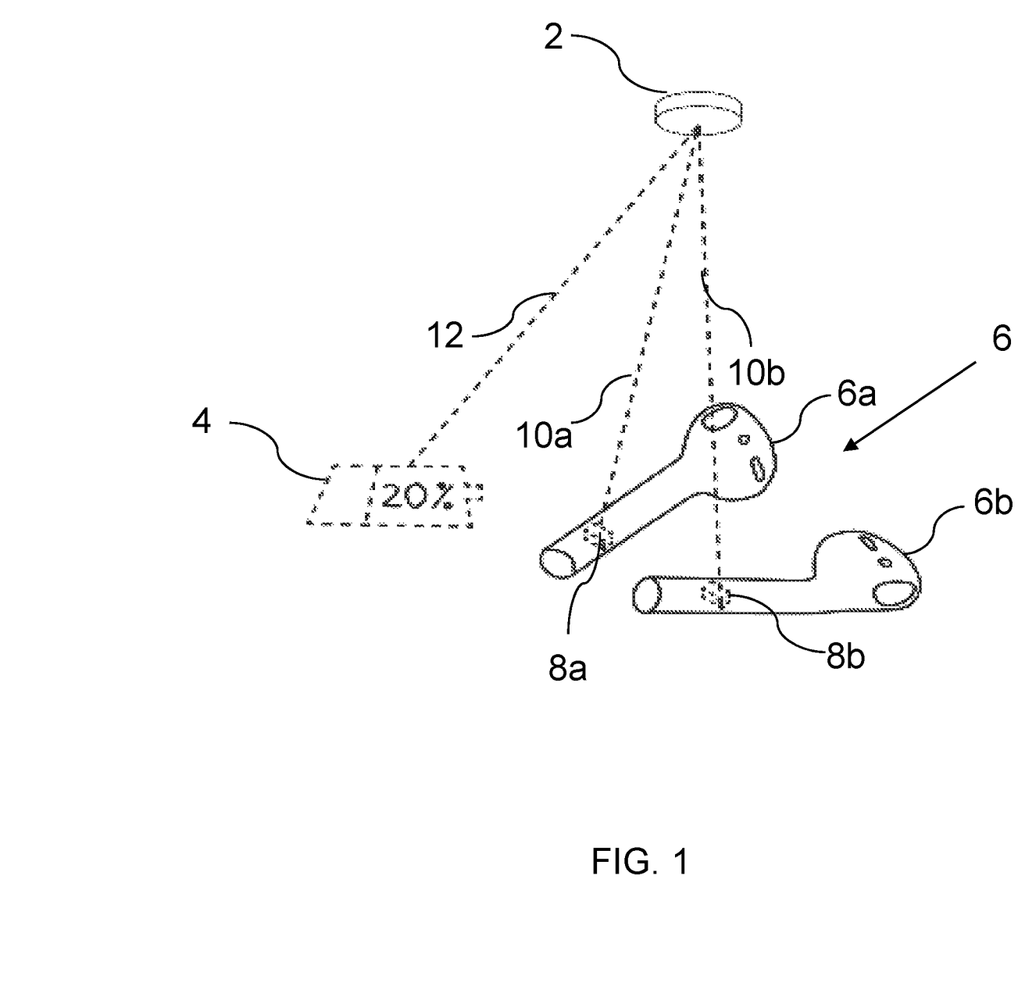
FIG. 1 is a schematic representation according to an embodiment of the present invention.

FIG. 1 shows a system for wirelessly charging electronic devices in a room, with a visual display 4 for the user to receive information relating to the operation of the system. The system shown in FIG. 1 is capable of charging a variety of different devices wirelessly with a laser beam. In this example, the device-to-be-charged (DTC) is shown as a pair of wireless earphones 6. A supply unit in the form of a central hub 2 is mounted to the ceiling of the room. When mounted to a surface in this way, the supply unit 2 can be powered by the mains electrical supply.

The supply unit 2 has the capability to wirelessly charge devices anywhere within a charging zone. The supply unit 2 charges the device 6a, 6b by means of a laser charging beam 10a, 10b. The device-to-be-charged 6 comprises a suitable photovoltaic device 8a, 8b to convert power from the beams 10a, 10b into electrical power for charging an on-board battery or otherwise being stored (e.g. in a super capacitor). The beams 10a, 10b could also be used directly to power some functioning of the respective device. It is important for the wavelength and power of the beam to be chosen with consideration of eye-safety regulations. Laser safety standards require the observance of exposure limits to prevent eye injuries. This limit is known as the 'maximum permissible exposure' (MPE) which is a calculated value dependent on inter alia the properties of the laser source that is used. The international standard for laser safety is IEC 60825-1: 2014 and equivalently for the US is (ANSI) Z136, and both standards include methods for calculating the MPE. For a charging laser, the beam must be safe, but must also transfer enough energy to charge the device in a reasonable time. Up to 0.5 W certain near-infrared wavelength lasers are considered to be safe. Alternatively, the source could generate a higher power charging laser (e.g. P>0.5 W) with a safety interlock switch mechanism which turns off the power when the line of sight to the device is broken, but this is significantly more complex.

The visible light beam 12 is generated from the supply unit 2 to project a visual image 4 for the user to observe. In this example, the visual light pattern 4 appears in the form of a symbol of a partially charged battery with a percentage value representing the current level of charge of the DTC 6a, 6b.

Figure 2:
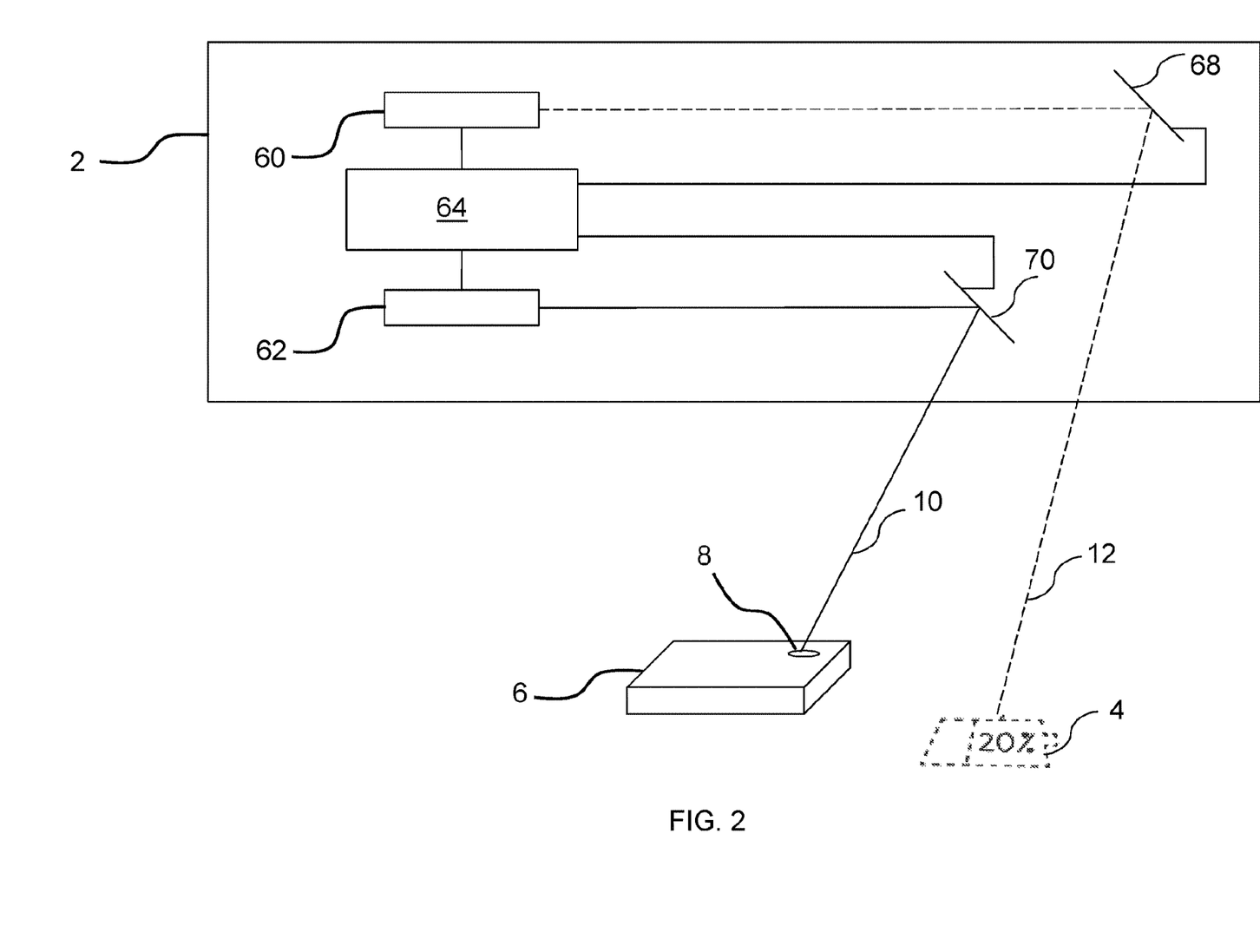
FIG. 2 shows schematically the supply unit in more detail.

FIG. 2 shows the supply unit 2 according to an embodiment of the invention, in more detail. The supply unit 2 comprises a visible laser source 60 and a charging laser source 62, a processor 64, and at least one steerable reflector herein referred to as the mirrors 68, 70. The processor 64 controls the operation of the laser sources 60, 62 and mirrors 68, 70. In this example, the steerable mirrors 68, 70 have a MEMS architecture. Some features that may be included in the supply unit 2, e.g. beam shaping optics, are omitted for clarity.

In this example, the supply unit 2 that is shown in FIG. 2 comprises two steerable reflectors 68, 70. Projecting the visible laser 12 works similarly to a galvanometer scanner whereby the laser is directed to and reflected by a rapidly moving mirror—effectively 'drawing' the visible light pattern. The charging laser beam 10 is directed from the supply unit 2 toward the PV cell 8 of the DTC 6. The beam 10 is deflected, and hence its position is controlled, by the mirror 70 positioned at the output of the charging laser source 62. Here, the charging laser beam 10 has an infrared wavelength, and could be generated by an off-the-shelf laser diode 62, e.g. the TO9-175 available from SemiNex. The visible beam 12 could be generated by a laser diode with a visible wavelength, e.g. the L450P1600MM laser diode from ThorLabs.

The processor 64 within the supply unit 2 is connected to the laser sources 60, 62 so that the operation of the lasers can be controlled by the system. The processor 64 also has the capability to process steering instructions to control the tilting angle of the mirrors 68, 70, based on information obtained during operation of the wireless charging system. For example, the charging laser mirror 70 is controlled by instructions based on feedback regarding the position of the DTC 6, so that the charging beam can be successfully directed towards the PV cell 8 for charging. The visible laser mirror 68 is controlled by instructions related to information that is to be projected visually to the user. Specifically, information that is relevant to the user is projected, e.g. battery levels of the DTC 6, an interactive option menu, indication of a zone for the DTC 6 to be placed in for charging etc. The processor 64 is also connected to a wireless communication module to communicate with the device-to-be-charged 6 over a radio communication channel—e.g. Bluetooth™.

Figure 3:
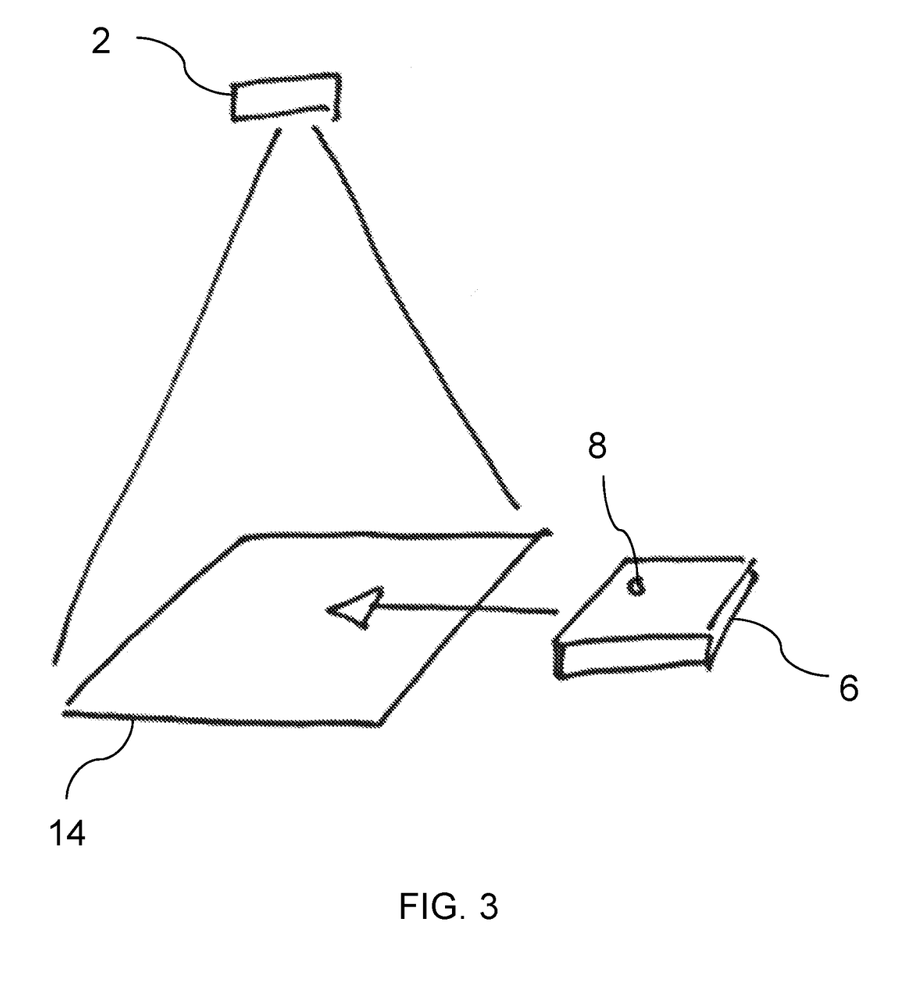
FIG. 3 is a schematic illustration of a device being placed in an illuminated charging zone.

The aforementioned charging zone—i.e. the area in which devices are placed to be charged—may be the whole room. However, FIG. 3 shows highly schematically that the charging zone may be defined by a smaller area, indicated to the user by a projected visible light pattern 14. The supply unit 2 projects the zone 14, which is envisioned to be the system-recommended area, where the most effective wireless charging is predicted to take place, e.g. an area where there appears to be no interruptions to the line of sight between the supply unit 2 and the DTC 6. Reducing the physical boundaries of the charging zone to an illuminated projection as shown in FIG. 3, may have the advantage of being more informative for the user as the user is expected to be unaware of where to place the DTC for more efficient charging. Reducing the charging zone area also provides the opportunity to build an inexpensive and robust wireless charging system as it reduces the need for a wider field of view and thus requires fewer micro mirrors. It also simplifies the task of aligning the charging laser beam 10 with the PV cell 8.

The user recognises this 'zone' 14 and places the DTC 6 in the illuminated region 14. The charging laser then is directed to the 'zone' 14 to locate the DTC.

Figure 4A:
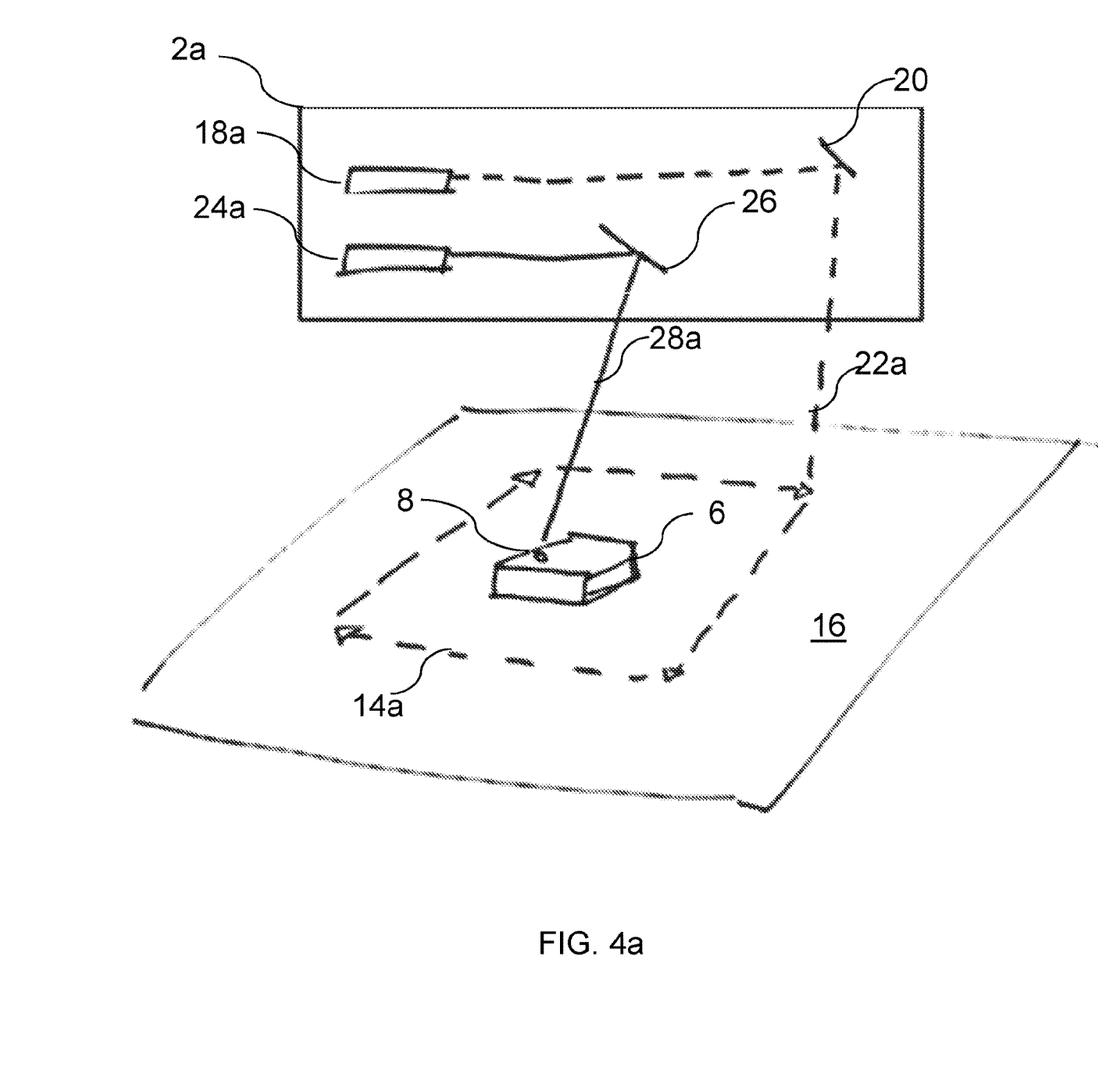
FIG. 4a is a schematic illustration of the supply unit indicating a charging zone and charging the device.

FIG. 4a schematically shows how the visible laser and charging laser, are output from the supply unit 2a, wherein the visible beam 22a is deflected from a first mirror 20 in the supply unit 2a and the charging beam 28a is deflected from a second mirror 26 in the supply unit 2a. The visible laser source 18a generates a beam 22a which is transmitted from the supply unit 2a and scanned on a surface 16, by steering the mirror 20, to 'draw' the visible light pattern 14a. In this example, the visible light pattern 14a is the charging zone projection illustrated in FIG. 3. There can be seen arrows in the light pattern 14a denoting the direction that the visible beam 22a is scanned, i.e. in showing that the beam rapidly traces out the perimeter of the zone 14a. Here, the DTC 6 is placed inside the 'zone' 14a and the charging laser source 24a generates a beam 28a. In order to locate the PV cell 8 of the DTC 6, the charging beam 28a scans the zone 14a, by manipulating the angle of the tilt of the mirror 26, until the beam 28a impinges upon the PV cell 8.

When the PV cell 8 is impinged upon by the beam, the DTC 6 sends a notification to the supply unit 2a will receive—e.g. in the form of a Bluetooth™ signal. On receipt of this notification, the processor 64 (not shown in FIG. 4a) can then determine the precise location of the PV cell 8 within the charging zone 14 based on the known latency of the Bluetooth™ feedback and the laser steering coordinates at that moment. The processor 64 then sets the tilt of the mirror 26 at the appropriate fixed position and scanning is halted, leaving the beam 28a in a position where it is directed at the PV cell 8 and charging the DTC 6. Since the charging zone 14 is very small compared to the whole volume of the room, such scanning can be completed quickly, even with a narrow (higher power density) laser beam.

If the system determines that the device-to-be-charged 6 is charging, then the system can commence optimising power delivery to the device. This helps to minimise useful energy from the laser beam being lost by a slight misalignment of the beam.

In the power optimisation process, the beam is moved by small amounts around the area where the photovoltaic cell 8 was localised through minor adjustments of the steerable mirror 26. During this, the device 6 gives the supply unit 2 feedback, related to the instantaneous power being received by the device. These form an iterative process, such that the direction of movements is maintained if power is increasing but changed if power is decreasing. The result of the process is that the beam is directed to a point relative to the photovoltaic cell 8 which results in optimal or near optimal power delivery. Once this optimal position is reached then the mirror 26 is fixed to that position and movement thereof is halted.

This optimisation process might be repeated periodically or if the device 6 notifies the supply unit 2 that the instantaneous power level it is receiving has dropped. The scan direction may be determined by monitoring the power delivered to the DTC during rapid small-scale movements of the beam. This determination of scan direction is based on the reasonable assumption that the movement of the device 6 is significantly slower than the movement of the beam and the speed of wireless communication. This tracking capability could further be enhanced by incorporating positional modelling algorithms into the control logic in the processor 64 of the hub 2—to partially predict the path taken by the device—e.g. by comparing the positions at which the PV cell 8 was 'hit'.

Figure 4B:
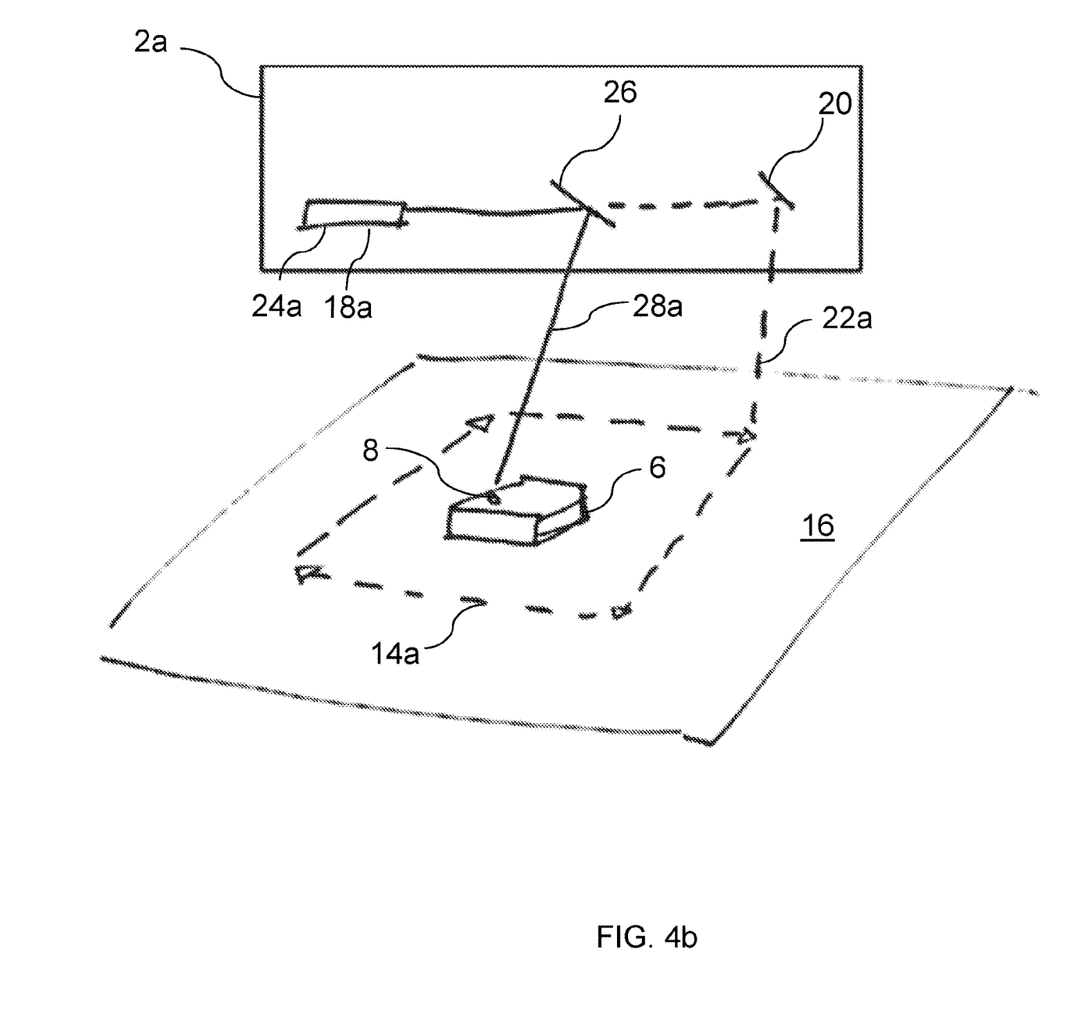
FIG. 4b shows the system of FIG. 4a with an alternative arrangement of the laser sources.

The laser sources 18a, 24a are shown in FIG. 4a to be arranged one above the other, however, they can equally be arranged in any other suitable way, e.g. FIG. 4b shows the system of FIG. 4a with the laser sources 18a, 24a arranged side by side in the depth dimension or even provided by a single common variable wavelength laser source.

Figure 5A:
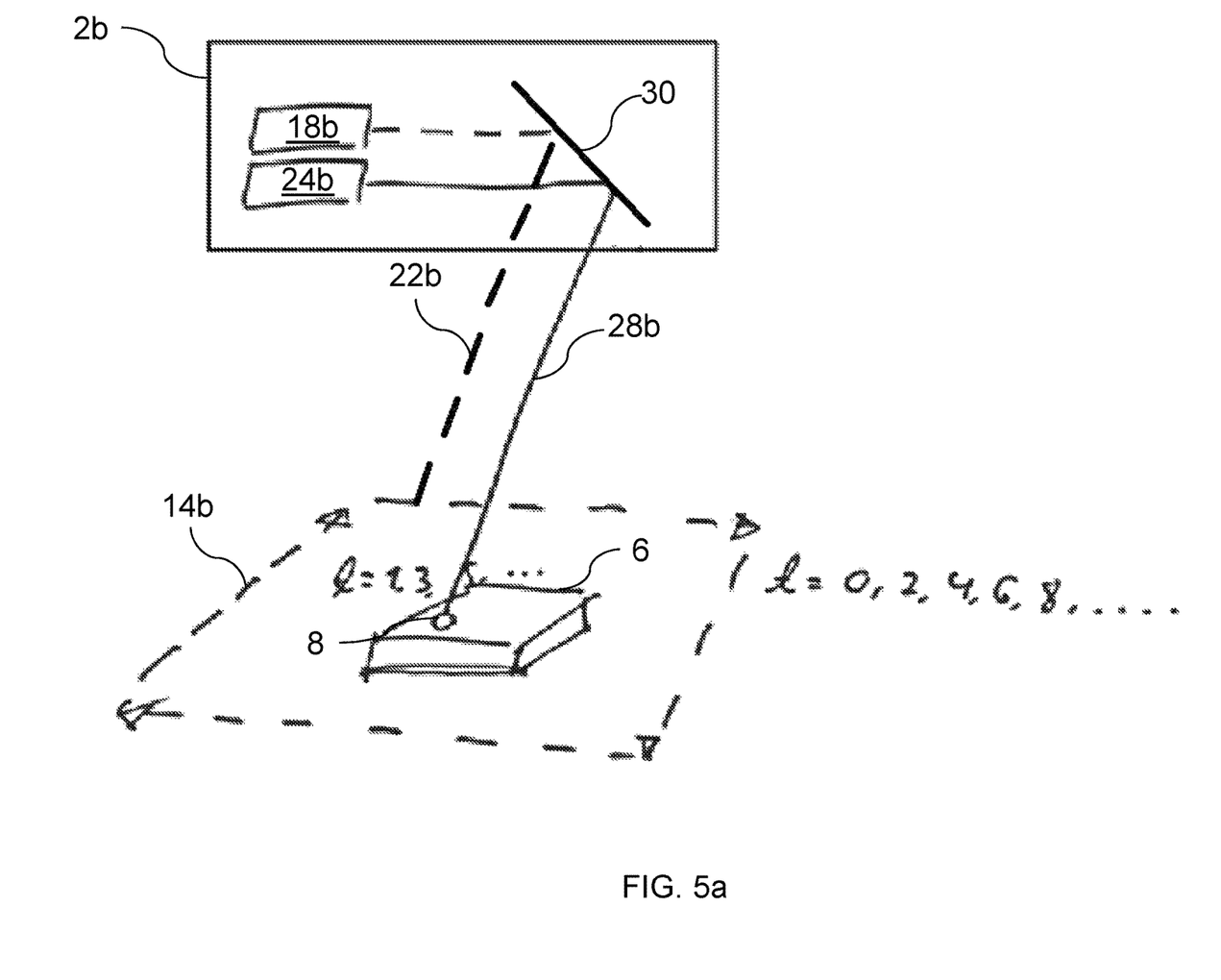
FIG. 5a is a schematic illustration of a variant of FIG. 4 wherein the visible light and charging laser share a common mirror.
Figure 5B:
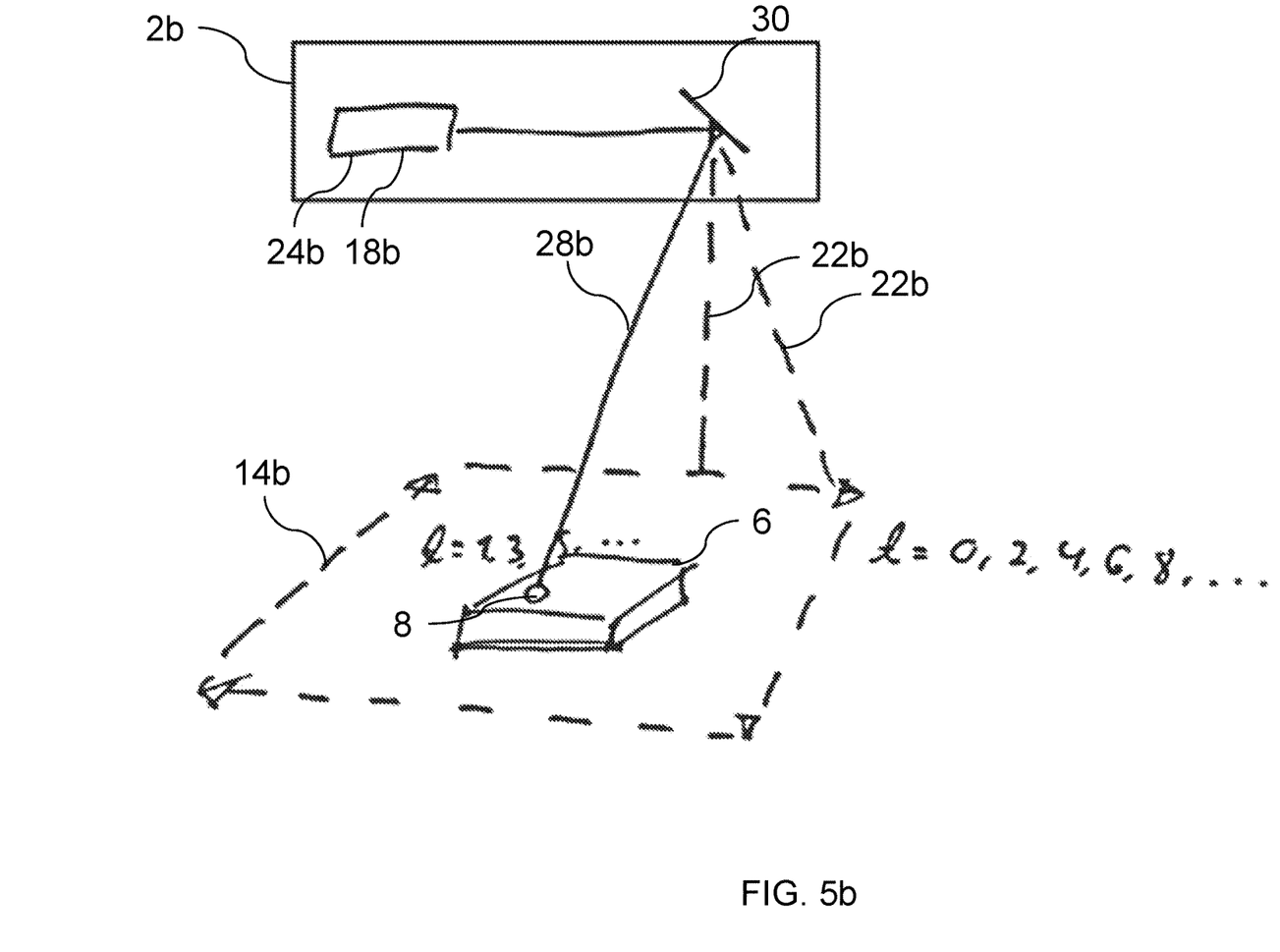
FIG. 5b shows the system of FIG. 4a with an alternative arrangement of the laser sources.

FIG. 5a schematically shows a variation of the system illustrated in FIG. 4a. Here, instead of each laser being directed to its own individual steerable mirror, the visible laser 22b and charging laser 28b share a common steerable mirror 30. In this arrangement, the charging laser 28b is pulsed. The visible projector laser 22b is also pulsed such that it is switched-on in the time intervals between the pulses of the charging laser 28b—i.e. the two lasers are time-division multiplexed. This is demonstrated in FIG. 5a where it can be seen that at a times t=0, 2, 4 etc. the near-infrared charging beam 28b is directed towards the PV cell 8 of the DTC 6. Then at times t=1, 3 etc., in between pulses of the charging laser 28b, the visible laser 22b is directed to a surface near to the DTC 6 and projects information to the user, e.g. the perimeter of the charging zone 14b. The lasers sources 18b, 24b are shown in FIG. 5a to be arranged vertically adjacent to each other, however, they can equally be arranged in any suitable way, e.g. FIG. 5b shows the same variant with the laser sources 18a, 24a arranged next to each other in the depth dimension or provided by a single common variable wavelength laser source.

Figure 6:
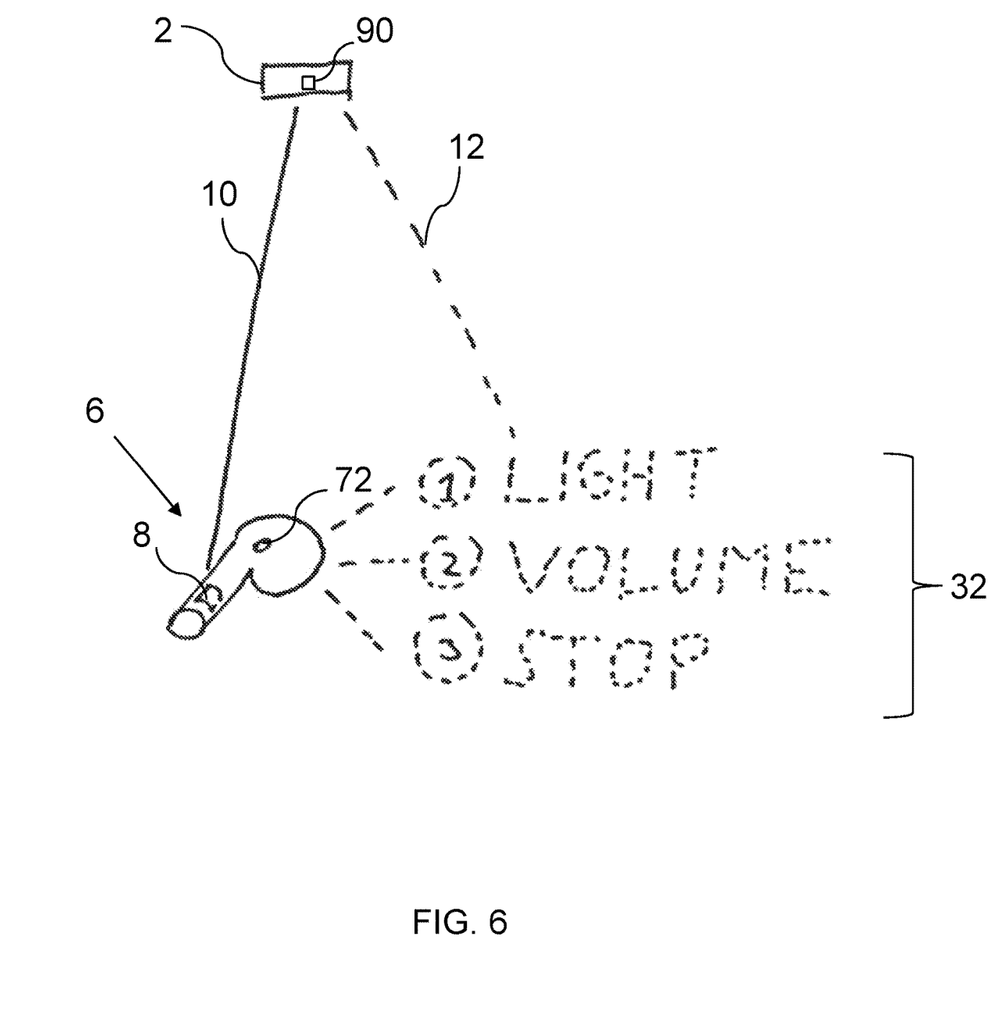
FIG. 6 is a schematic illustration of the invention wherein the visible light pattern is an option menu.

Another embodiment of the wireless charging system is schematically represented in FIG. 6, where the visible light pattern comprises an option menu 32. The visible beam 12 is scanned onto the surface to project the information, effectively 'drawing' the pattern by rapid movement of the MEMS mirror inside the supply unit 2. In other embodiments the system could use a digital micromirror device (DMD) for projecting the visible pattern. For example, the supply unit could comprise a DMD and a visible laser source. In such an example, the visible beam generated by the visible light source would be reflected by the DMD to form the image of the visible pattern. Similarly an LED arrays could be used to project the visible pattern.

The menu 32 presents the user with options which enable the user to control the operation of the DTC 6, e.g. light, volume, stop etc. The supply unit 2 comprises a sensor 90 for detecting the selection made by the user, such a sensor could be e.g. acoustic or optical.

The user may select one or more of the options 32 by hovering a finger over the preferred option, e.g. "(2) volume" and breaking the beam 12 that projects the light pattern. This may be detected by a sensor e.g. an optical sensor in the form of a camera 90. Equally, the user may select one or more of the options 32 by speaking the preferred option e.g. by reading out the numbers "one", "two" or "three". If the system has such a voice control feature, then the spoken command may be detected by a microphone 72 on the DTC 6. The DTC may be configured to detect the spoken selected options, recognise the command, and subsequently communicate instructions to the supply unit via a wireless communication channel, e.g. Bluetooth™.

The following drawings illustrate examples of gesture recognition. Other features of the wireless charging system, such as the supply unit 2 which would be the source of the visible projections, is omitted from the drawings for clarity.

Figure 7:
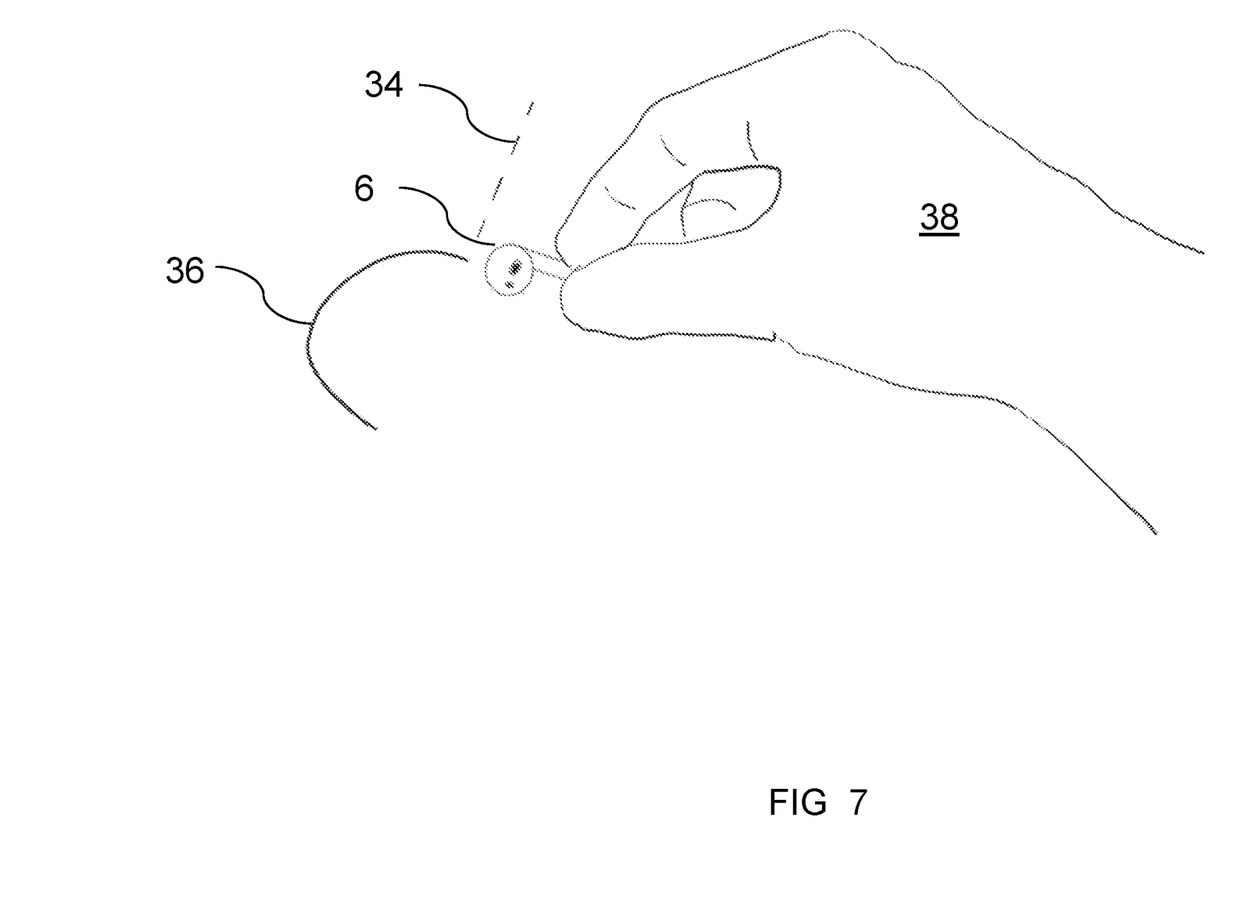
FIG. 7. Illustrates that the movement of the device can be used to draw a visible light pattern.

FIG. 7 illustrates a hand 38 moving the DTC 6, to indicate where the visible beam 34 should project the visible pattern 36. Such movement could be determined by analysing the power optimisation adjustments necessary to keep the charging laser aligned with the PV cell. As mentioned above, such power optimisation may be carried out continuously while a device is charging to assess the effect of small movements of the charging beam, or upon the DTC noticing that the power level it is receiving has dropped.

Here, the DTC 6 is used as a stylus, where the movement of the DTC 6 is tracked by the system. The DTC 6 is moved in a curve and the detected pattern of movement is output from the supply unit 2 as a visible light pattern 36. This feature may be used to draw the perimeter of a charging zone. In one example, the DTC 6 traces the outline of the intended charging zone, the user then places the DTC 6 inside the outline illuminated by the visible beam, and the supply unit 2 scans the area within the outline to locate the PV cell 8 of the DTC 6 and begins charging. Alternatively, the pattern 36 made by the DTC 6 could be a symbol representing a command for the system or equally the DTC 6 to perform e.g. play, pause, show battery level etc.

Figure 8:
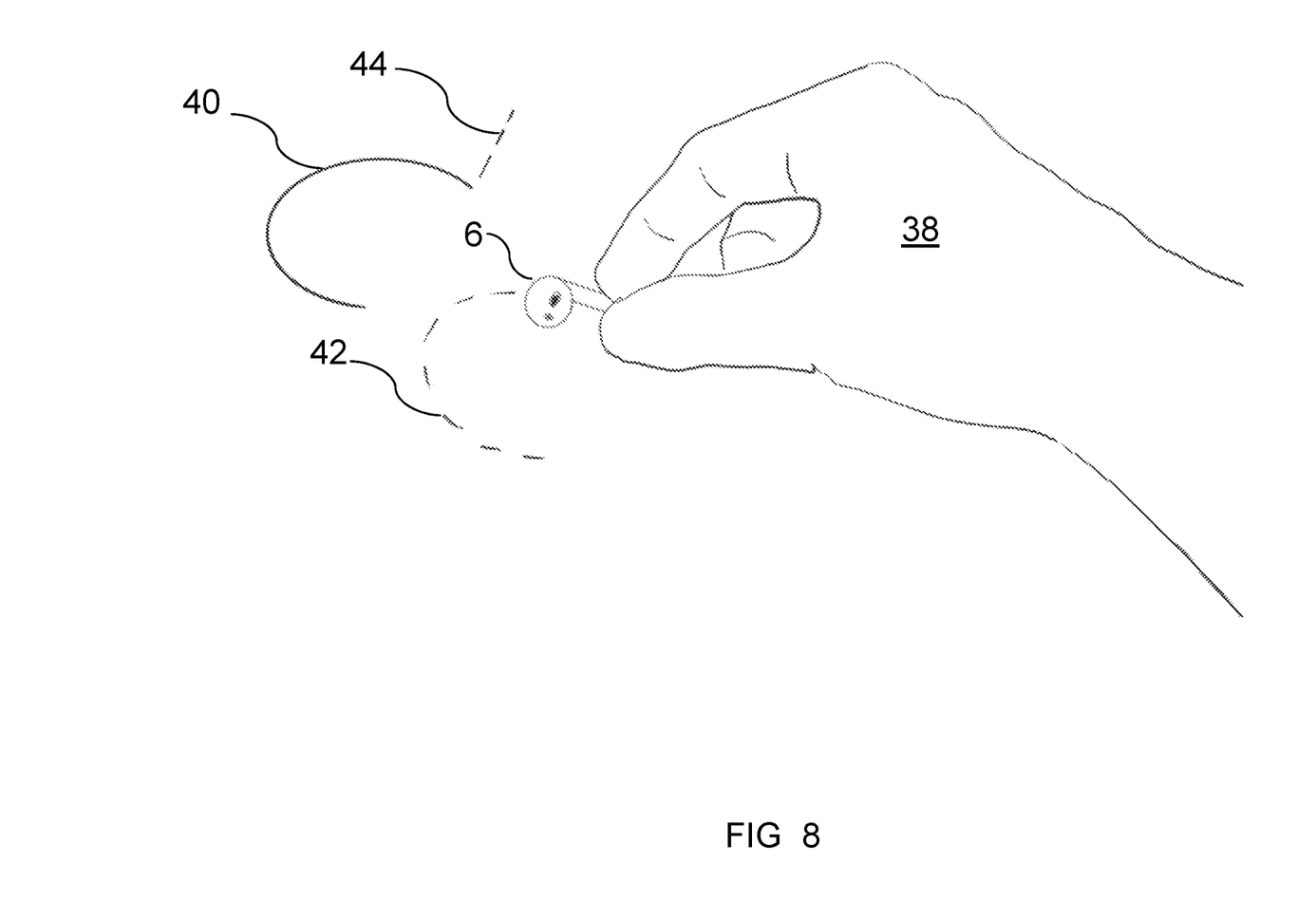
FIG. 8 illustrates a variant of FIG. 7 where the visible light pattern appears offset to the movement causing it.

FIG. 8 illustrates a variant of the process shown in FIG. 7, where the visible light pattern 40 appears a short distance away from the movement causing it. This allows the user to observe the projected symbol 40 while minimising the possibility of the user being an occlusion to the line of sight between the supply unit 2 and the DTC 6.

Figure 9:
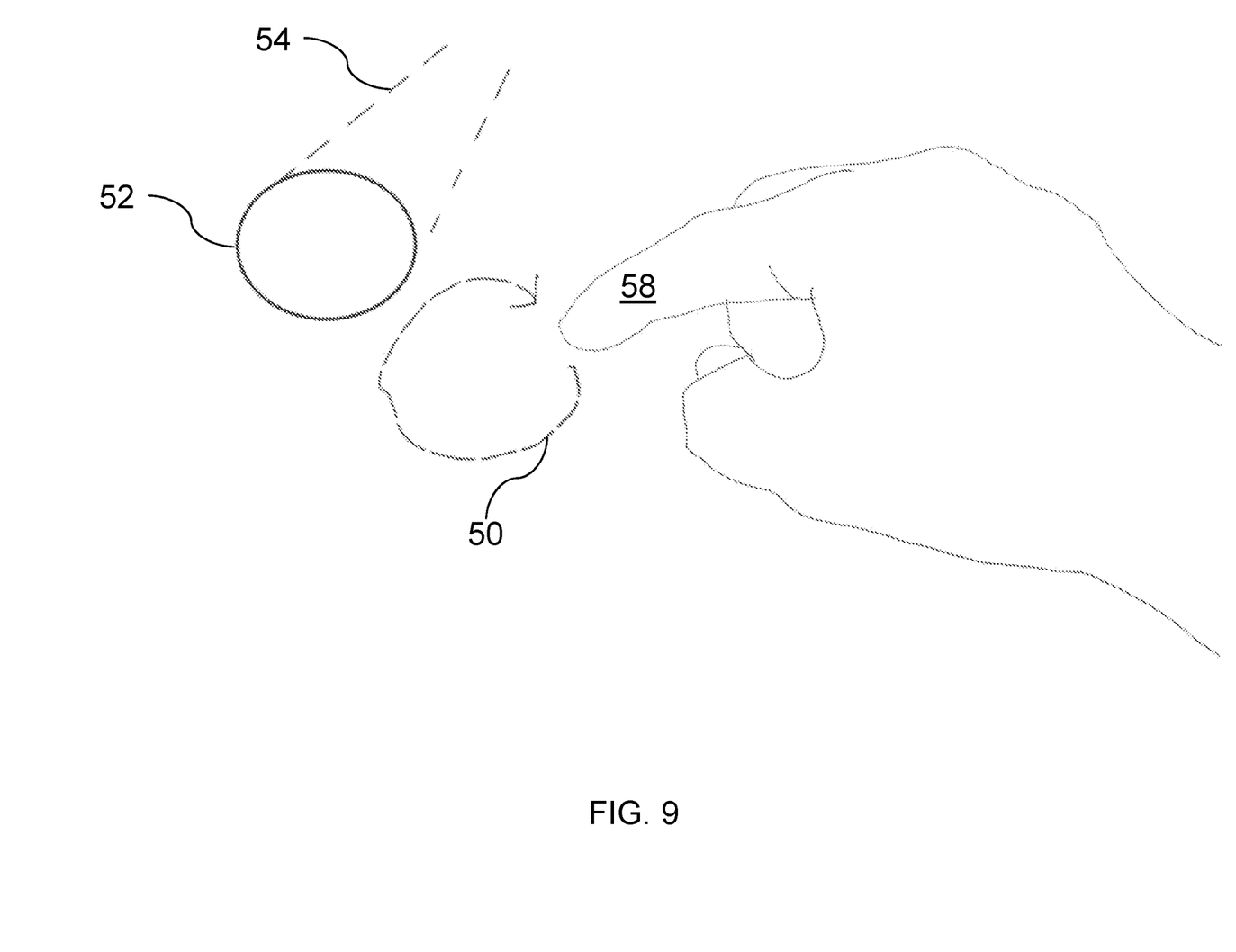
FIG. 9 illustrates the system recognising a symbol drawn by the gesture, and confirming recognition by projecting said symbol.

FIG. 9 illustrates symbol recognition, and shows a hand 58 tracing a circular gesture 50. The gesture 50 does not have to exactly resemble the intended symbol 52 for the system to recognise the symbol. The visible light pattern 52 confirms the recognition of the symbol by projecting the intended symbol 52 a short distance away from the user's hand 58. The gesture may be detected by an optical sensor or ultrasonic transducer at the supply unit 2 and gesture recognition algorithms could be employed to determine the performed gesture. The processor 64 in the supply unit 2 may then instruct the system to carry out the associated command. In FIG. 9 the finger of the user is effectively used as a stylus. For this type of gesture recognition, an optical sensor, e.g. a 3D imaging system, may track the finger's motion by detecting both the finger and a plane of interest. For example, the plane of interest may be aligned with the surface of a table. The approaching hand 58 may be scanned to detect (e.g. with 3D imaging) the finger approaching and touching this plane and the subsequent motion of the finger may be tracked by the 3D imaging system. The 3D imaging system may be able to determine the distance between the finger and table. This may provide better gesture recognition, e.g. compared to beam-breakage detection, reducing the likelihood of accidental false positives and helping to ensure that the interaction is only registered when the finger touches the surface of the table.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A system for wirelessly charging at least one device, said device comprising a photovoltaic cell for converting incident light into electrical energy, the system further comprising a supply unit arranged to transmit a charging laser beam to the photovoltaic cell of the device, wherein the supply unit is further arranged to transmit a visible light pattern for providing a user with information relating to charging of the device.

2. The system of claim 1, wherein the information relating to the operation of the system comprises information relating to operation of the device to be charged.

3. The system of claim 1, wherein the visible light pattern indicates a zone in which the device should be placed.

4. The system of claim 3, wherein the supply unit is arranged to transmit the charging laser beam to the photovoltaic cell of the device automatically when the device is placed in the indicated zone.

5. The system of claim 3, wherein the supply unit is arranged to determine that the device is in the indicated zone.

6. The system of claim 3, arranged to project a visible light pattern confirming that the device is in the indicated zone.

7. The system of claim 1, arranged to conduct a power delivery optimisation phase comprising a feedback loop wherein the beam is moved in response to a power value reported by the device to the supply unit.

8. The system of claim 1, comprising a wireless communication channel for communication with the device, the system being arranged to transmit the visible pattern based on instructions received from the device.

9. The system of claim 1, wherein the visible light pattern forms part of an interactive user interface, wherein the user is able to control the device or operation of the wireless charging system via an interaction mechanism.

10. The system of claim 9, wherein the visible light pattern comprises instructions or a visual prompt for the user to move or tilt the device to improve charging or power delivery.

11. The system of claim 9, wherein the interaction mechanism comprises voice control or gesture recognition.

12. The system of claim 9, wherein the visible light pattern comprises one or more options and the system is arranged to determine a user's selection of the option or one of the options.

13. The system of claim 1, arranged to obtain information relating to a location of the device by scanning the charging laser beam over a scan volume and the supply unit receiving a notification when the laser beam impinges on the photovoltaic cell.

14. The system of claim 13, wherein the notification comprises a signal received over an independent communication channel from the device indicating that the laser beam has impinged on the photovoltaic cell thereof.

15. The system of claim 14, wherein the notification comprises a radio frequency signal.

16. The system of claim 14, wherein the charging laser beam has sufficient power density to provide enough power to the device to allow the device to transmit the notification signal.

17. The system of claim 1, wherein the supply unit comprises at least one steerable micro-mirror for directing the laser beam and wherein the system is arranged to direct a visible light beam transmitting the visible light pattern and the charging laser beam respectively to different steerable micro-mirrors.

18. The system of claim 1, wherein the supply unit is a relay unit separate from a hub unit and comprising a wired or wireless connection to the hub unit and wherein the relay unit is wirelessly powered or charged by the hub unit.

19. A method of operating a wireless charging system for charging at least one device having a photovoltaic cell for converting incident light into electrical energy, said method comprising:

transmitting a charging laser beam to said photovoltaic cell and thereby powering or charging said device;

transmitting a visible light pattern indicating at least one user selection option; detecting a user selecting said option; and carrying out a further action dependent on said option being selected.

20. A method of wirelessly charging at least one device having a photovoltaic cell for converting incident light into electrical energy, said method comprising:

transmitting a visible light pattern indicating a zone;

placing said device into said zone; and transmitting a charging laser beam to the photovoltaic cell of the device to effect powering or charging said device.

21. The method of claim 20, comprising transmitting the visible light pattern indicating the zone onto a surface; and placing the device into said zone on the surface.

* * * * *